United States Patent [19]

Wesch

[11] Patent Number: 4,496,833

[45] Date of Patent: Jan. 29, 1985

[54] DETECTION PROCESS AND APPARATUS

[76] Inventor: Ludwig Wesch, Alter Weg 18, Glücksburg-Meierwik, Fed. Rep. of Germany

[21] Appl. No.: 428,255

[22] Filed: Jan. 26, 1965

Related U.S. Application Data

[62] Division of Ser. No. 67,855, Nov. 7, 1960.

[51] Int. Cl.$^3$ .......................... H01J 40/14; G01J 1/00; H01J 40/00
[52] U.S. Cl. .......................... 250/211 R; 250/203 CT; 250/213 R; 250/342; 313/461
[58] Field of Search ......... 250/213, 211, 203, 83.3 IR, 250/203 CT, 211 R, 213 R, 342; 1 R/DIG. 220; 244/14.3; 315/151, 155; 313/65, 66, 96, 101; 178/6.8

[56] References Cited

U.S. PATENT DOCUMENTS 2,234,328  3/1941  Wolff .
2,732,469  1/1956  Palmer ................................. 250/213
3,069,551  12/1962  Haine ................................. 250/213

OTHER PUBLICATIONS

Tomaschek, "Illumination and Structure of Solid Materials", 1943, Committee Press R. Oldenbourg (Germany).

*Primary Examiner*—S. C. Buczinski
*Attorney, Agent, or Firm*—Michael N. Meller

EXEMPLARY CLAIM

1. Apparatus for locating a target which radiates or reflects electromagnetic energy comprising a circular-scan cathode-ray tube including a screen and an electron beam moving over said screen, regions of said screen fluorescing when impinged upon by said electron beam to generate light energy, a plurality of semiconductor elements disposed on said screen, each of said semi-conductor elements includng a layer of photoconductive material adjacent said screen and a layer of photo-dielectric material on said layer of photoconductive material and adapted to receive electromagnetic energy from said target, said photoconductive material having a low resistance only when receiving light energy, said photo-dielectric material changing electrical capacitance when receiving electromagnetic energy, means for conductively connecting together said layers of photoconductive material to provide a first terminal, an electromagnetic radiation permeable conductor disposed on all other said layers of photo-dielectric material and including a second terminal, and an oscillator means including a tuned circuit connected to said first and second terminals, said oscillator means transmitting a target indicating signal when the layer of photo-dielectric material of one of said semi-conductor elements receives electromagnetic energy simultaneously with the receipt of light energy by its associated layer of photoconductive material.

1 Claim, 10 Drawing Figures

DETECTION PROCESS AND APPARATUS

This invention relates to the detection of remote objects through the agency of electromagnetic radiation coming from the remote objects and is a division of my copending application Ser. No. 67,855 filed Nov. 7, 1960.

Various processes and apparatus for the active and passive location of objects at great distances are known.

The active processes include techniques whereby light of an appropriate wavelength, preferably visible and infra-red light, is directed against an object so that the image of the target area is made visible to the observer by suitable means. In case an infra-red position finding instrument is used, this is accomplished by various kinds of image-converter devices.

In the passive method, the natural radiation of the target is used for detecting the same.

Various systems have been disclosed, which use photo-electric cells as radiation-sensitive pick-ups and either permit the same to rotate or permit a scanning of the horizon by means of a fixed cell and a rotating optical system. Such panoramic devices are used both in radar and infra-red techniques.

Since heretofore known systems require mechanically rotating devices, they have limited scanning speeds and are generally cumbersome.

It is accordingly an object of the invention to provide apparatus for scanning a target area for reflected or radiated electromagnetic waves, which is of simple construction, and insures an almost inertialess detection of high sensitivity with great directional accuracy.

According to an aspect of the invention there are provided a plurality of cells. Each cell includes a photo-dielectric means and a photoconductive means connected in series. The photo-dielectric means are exposed to incident electromagnetic radiation from a target. The photoconductive means are scanned by a controllably movable light source. All of the photoconductive means are connected to a common circuit. Accordingly, whenever any photoconductive means receives light from the movable light source the capacitance of its associated photo-dielectric means is switched into the common circuit. More particularly, this aspect of the invention contemplates a photo-electric ring cell operated by an electron beam and by light received from any arbitrary angle from an object to be located. The signal taken from the cell and amplified may be fed, for example, to an electronic receiving tube which makes the signal received detectable. The process of the invention is preferably carried out with the use of a photo-electric ring cell, which is operated as a receiver together with a cathode-ray tube, and, furthermore, with an indicating or detecting instrument preferably in the form of a second cathode-ray tube on which the signal is made visible. The ring cell may rest on the luminous or fluorescent screen of the associated cathode-ray tube, one side of the cell being constantly excited by the fluorescent light of the fluorescent screen and the other side by the light to be detected. The ring cell may be excited through a wire netting or screen or through a semipermeable conductive layer on the one side. The light to be detected preferably is also passed through a wire netting and falls on the photo-dielectric material of the cell. This wire netting, too, may be replaced with a semipermeable layer.

The process according to the invention and apparatus for carrying out said process will be explained for several embodiments as illustrated in the accompanying drawings, in which.

Figure 1:
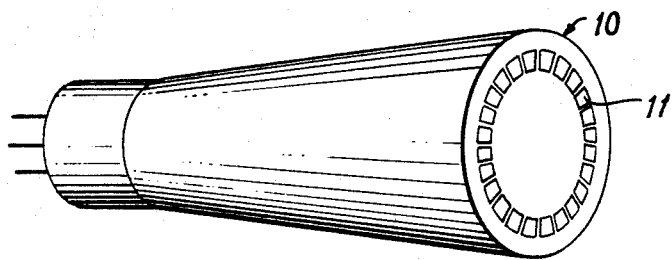
FIG. 1 is a diagrammatic perspective view of a ring cell on a cathode-ray tube in accordance with the invention.
Figure 2:
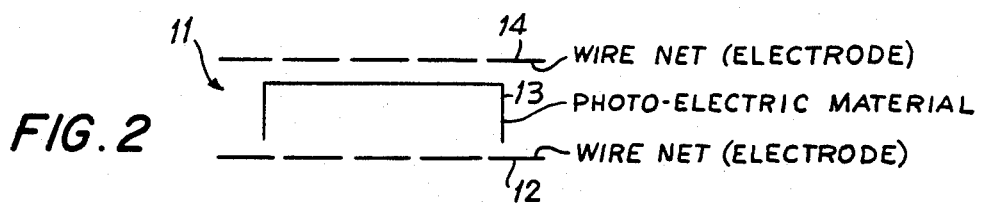
FIG. 2 is a vertical section through the ring cell of FIG. 1.

As is apparent from FIGS. 1 and 2 a ring cell 11 is continuously excited from one side, through a wire netting or screen 12, or through a permeable conductive layer, by the light of the fluorescent screen of a cathode-ray tube 10. The light to be detected, and especially infra-red light, falls through the wire net or screen 14 onto the photo-electric material 13. Screens 12 and 14 are electrodes for electrically connecting photo-electric material 13 to an external circuit.

The process according to the invention is basically applicable to all wavelength regions of the electromagnetic spectrum, if appropriate semi-conductor substances are used for the cells. As far as position-finding processes and apparatus are concerned, visible and infra-red regions of the spectrum will mainly be used, but cases in which ultra-violet will be used are conceivable.

The semi-conductor system, as illustrated in FIGS. 1 and 2, is constructed of a covering layer, the actual semi-conductor material, and the two wire gauze or net electrodes. It is, of course, possible to use, instead of a wire gauze electrode, any conductive coating, if it is permeable in the spectral region of the radiation of the fluorescent screen of the cathode-ray tube or in the spectral sensitivity range of the semi-conductor substance.

Figure 3:
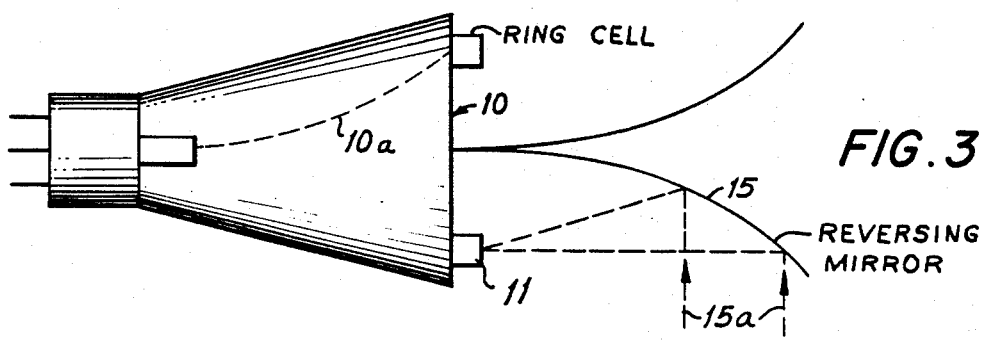
FIG. 3 shows the receiving arrangement in vertical section through the cathode-ray tube of FIG. 1.

The arrangement diagrammatically illustrated in FIG. 3 shows the tube 10 with a rotationally and symmetrically circulating electron beam 10a. This figure also shows the ring cell 11, and a reversing mirror 15, which directs the light rays 15a of the target or object to be located onto the photo-electric material of the ring cell. Thus, different segments of the ring cell 11 will be energized by radiation from different azimuth directions respectively. Each azimuth direction having associated therewith a particular segement of ring cell 11.

Figure 4:
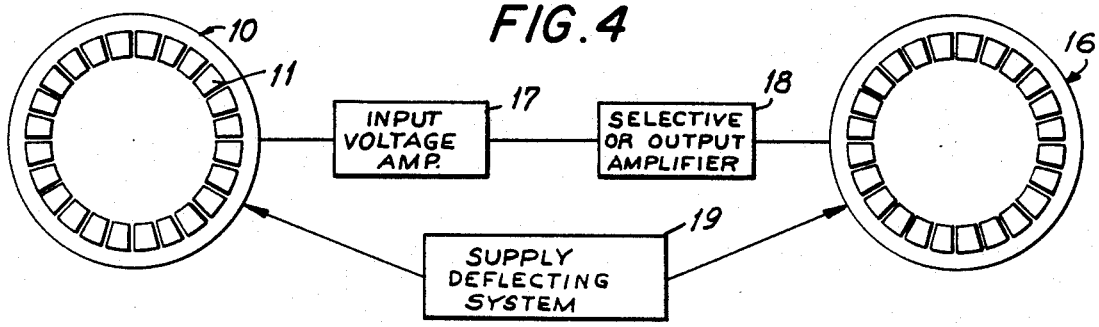
FIG. 4 shows the overall arrangement of instruments to be used according to the invention.

In the overall arrangement according to FIG. 4, a receiving cathode-ray tube 16 is used, which is of the same kind as the receiving cathode-ray tube 10. Both the tube 10 and the tube 16 are operated from a common supply and deflecting system 19. This system includes a pulser and it is possible to operate the tubes 10 and 16 by these pulsers in a synchronized operation, i.e. to provide synchronous circular scans.

The ring cell 11 is coupled to an input voltage amplifier means 17 whose output is connected to the input of an output amplifier 18 which is connected to the control electrode (not shown) of the tube 16. Thus, when the scans of tubes 10 and 16 are in frequency and phase synchronism, if radiation is received from the "twelve o'clock" azimuth direction by ring cell 11, a "blip" will be present at the "twelve o'clock" position on the screen of tube 16.

Figure 5:
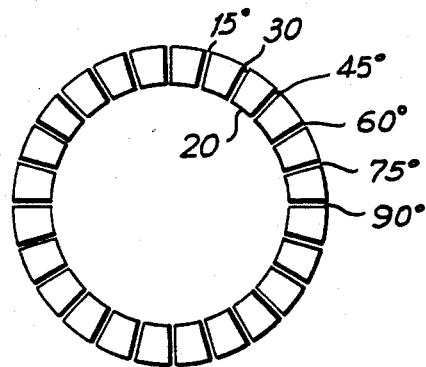
FIG. 5 shows the ring cell subdivided into individual sections.
Figure 6A:
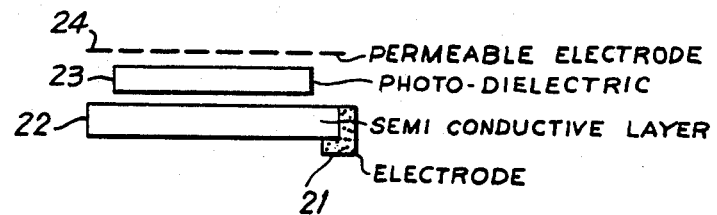
FIGS. 6a and 6b are vertical sections through a ring cell section, each with a particular arrangement of its parts.
Figure 7:
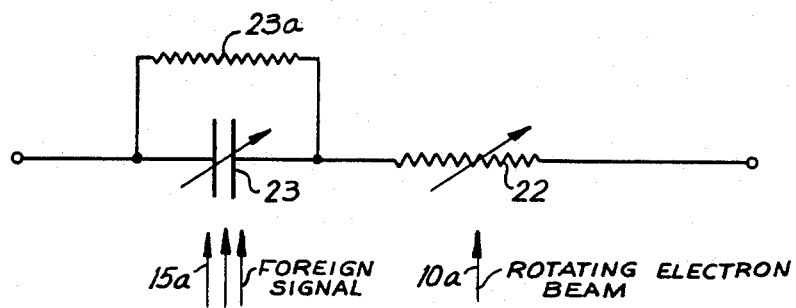
FIG. 7 shows schematically one of the individual ring elements incorporating a light responsive switch.

In general the ring element 11 includes a plurality of elements 20 FIG. 5. Each of these elements changes in electrical capacitance when receiving electromagnetic radiation. As will become apparent hereinafter, the change in electrical capacitance is used to detect which of the elements is receiving electromagnetic radiation from the target. If an element is receiving target radiation its electrical capacitance increases. The elements 20 are serially scanned to effectively measure the electrical capacitance of each of the elements 20 sequentially. The scanning is such that each element is sequentially connected into an oscillator circuit. The oscillator may be tuned to a given frequency when an element being scanned is not receiving target radiation. Therefore, when the scanned element is receiving target radiation resulting in an increase of its electrical capacitance the oscillator circuit is detuned to another frequency. When apparatus such as a tuned amplifier is provided to detect the other frequency, signals are generated. FIG. 6a, shows one embodiment of a typical element 20. Portion 21 is a contact point formed by a spot-welded metallic electrode, element 22 is a semi-conductive layer which, upon exposure, changes its resistance by an extraordinarily large amount, element 23 is the photo-dielectric, and element 24 is permeable electrode similar to the electrode 14 in FIG. 2. The entire element 20 operates as shown in FIG. 7 wherein the elements with the same reference characters represent the electrical schematic equivalents of the physical elements of FIG. 6a. The element is composed of a series connection of a photosensitive variable resistor 22 and a photo-dielectric capacitor 23 with which an internal resistor 23a determined by the kind of the photo-dielectric used is connected in parallel if desired. The variable resistor is at first high-resistance of the order of magnitude of one or more megohms, so that such a ring element with its capacitance 23 is at first inoperative as an oscillating circuit. Only at the moment of an exposure, for example, to the rotating electron beam 10a, is the value of resistor 22 lowered to such an extent that the capacitance 23 is operatively connected to the oscillating circuit and every change of capacitance because of the reception of a foreign signal 15a, infra-red light, for example, (FIG. 7) produces a change of frequency of the oscillating circuit which is connected to the two terminals of FIG. 7 which represent electrodes 21 and 24 of FIG. 7a.

Figure 8:
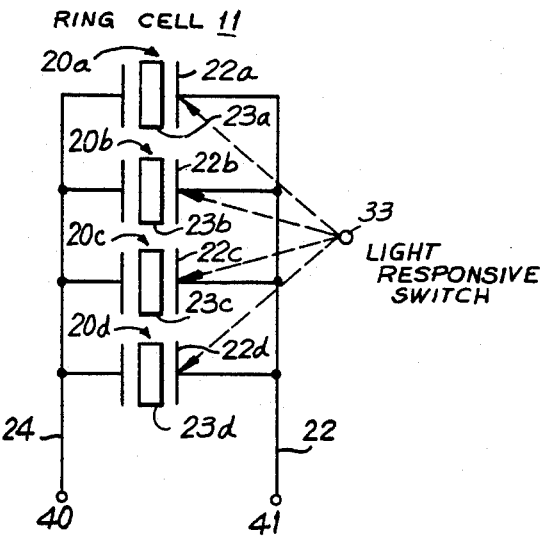
FIG. 8 shows schematically the individual elements of the ring cell connected in parallel for direct connection to an oscillating circuit.

Since the capacitance is fully connected to the oscillating circuit only at the moment of the change of resistance, it is readily possible to connect in parallel all individual elements, as shown in FIG. 8, for elements 20a to 20d, and to connect them directly to an oscillating circuit (FIG. 9) via terminals 40 and 41. In the arrangement according to FIG. 8 light responsive switch 33 is intended to comprise the photoresistors 22 and the fluorescent light generated by electron beam 10a.

Figure 6B:
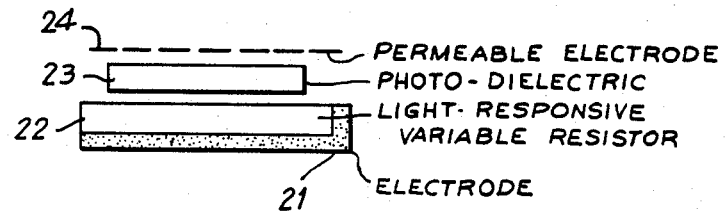

FIG. 6b illustrates another preferred embodiment. The electrode 21 is placed, in the form of a ledge, about the light-responsive resistor 22. The width of the strip is about 1 to 2 mm., so as not to cause an unnecessary increase of capacitance. This overall arrangement can also employ modulation by a light-responsive switch 33, so that it becomes possible to use an amplitude selective amplifier in this case.

Figure 9:
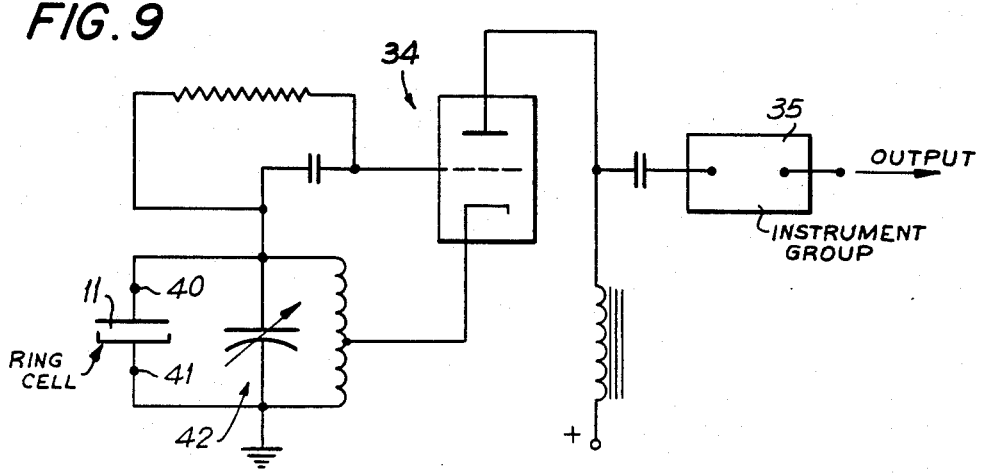
FIG. 9 shows an arrangement with sensitive, low-noise frequency modulation circuit systems.

FIG. 9 shows an arrangement for a sensitive, low-noise frequency modulation system, in which the ring cell 11 is placed in the tuned circuit 42 of the oscillator 34 as a capacitance and the oscillator 34 is in frequency modulation relation with the sequentially arranged instrument group 35 which may be apparatus operating in synchronism with the rotation of the beam of the tube 10 to indicate azimuth position of infra-red light sources such as the apparatus shown in FIG. 4, for example.

It should be noted that the ring cell 11 in FIG. 9 is equally representative of the apparatus of FIG. 8 and that therefore the terminals 40 and 41 of the apparatus of FIG. 8 are connected to the tuned circuits of the oscillator of FIG. 9.

What is claimed is:

1. Apparatus for locating a target which radiates or reflects electromagnetic energy comprising a circular-scan cathode-ray tube including a screen and an electron beam moving over said screen, regions of said screen fluorescing when impinged upon by said electron beam to generate light energy, a plurality of semi-conductor elements disposed on said screen, each of said semi-conductor elements including a layer of photoconductive material adjacent said screen and a layer of photo-dielectric material on said layer of photoconductive material and adapted to receive electromagnetic energy from said target, said photoconductive material having a low resistance only when receiving light energy, said photo-dielectric material changing electrical capacitance when receiving electromagnetic energy, means for conductively connecting together said layers of photoconductive material to provide a first terminal, an electromagnetic radiation permeable conductor disposed on all other said layers of photo-dielectric material and including a second terminal, and an oscillator means including a tuned circuit connected to said first and second terminals, said oscillator means transmitting a target indicating signal when the layer of photo-dielectric material of one of said semi-conductor elements receives electromagnetic energy simultaneously with the receipt of light energy by its associated layer of photoconductive material.

* * * * *